Inventor
Sven Gynt
By
Attorney.

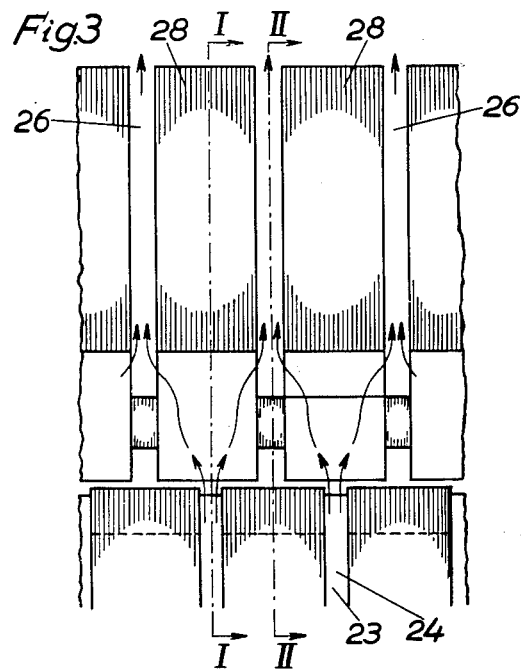
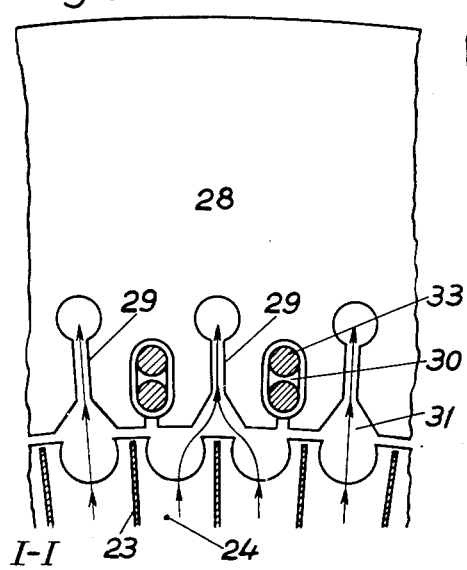
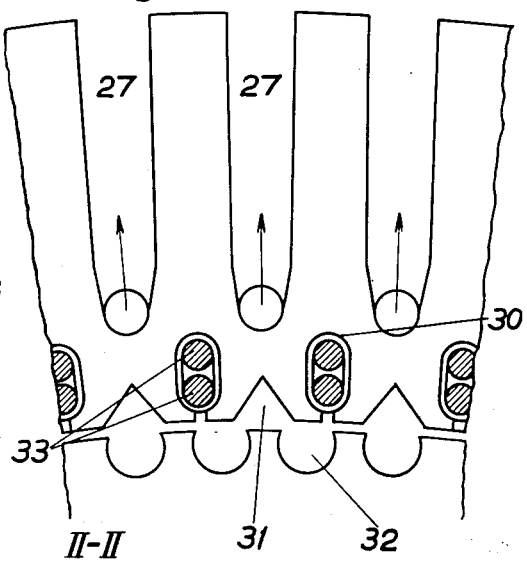

Patented Oct. 28, 1952

2,615,938

UNITED STATES PATENT OFFICE 2,615,938

VENTILATION SYSTEM FOR ELECTRIC MACHINES

Sven Gynt, Vasteras, Sweden, assignor to Allmanna Svenska Elektriska Aktiebolaget, Vasteras, Sweden, a corporation of Sweden Application June 21, 1951, Serial No. 232,725

3 Claims. (Cl. 171—252)

The present invention concerns a ventilation system for electric machines and is especially intended to be used for electric machines enclosed in a gas-tight housing which is filled with a gas volume, preferably hydrogene, which gas volume is circulated through the machine and a cooler which preferably is enclosed in the housing.

The said gas volume is preferably circulated by means of the rotor of the generator, but a fan may also be mounted on the shaft of the generator. In a preferred form of the invention the generator is driven by an electric motor entirely enclosed in the housing.

The invention is chiefly characterised thereby that the stator core consists of packages of laminations, in which two kinds of slots for ventilation purposes are punched. One kind of these slots form radial ducts which commence at the outer periphery of the stator core and extend inwardly terminating a distance from the air gap of the machine. The other kind of said ventilation slots extend axially between said ventilation ducts and commence at the air gap and extend radially outwardly to a distance past the bottom of said ventilation ducts.

In one form of the invention the rotor rim consists of packages of laminations which are separated by spacers so that radial ventilation ducts are formed.

By this arrangement a very effective cooling of the iron close to the winding is attained, because the heat generated in the iron and the winding is transmitted to the cooling gas without traversing any insulating layer of air or vanish between the laminations which layers in conventional machines form an obstacle to the heat transmission.

Figure 1:
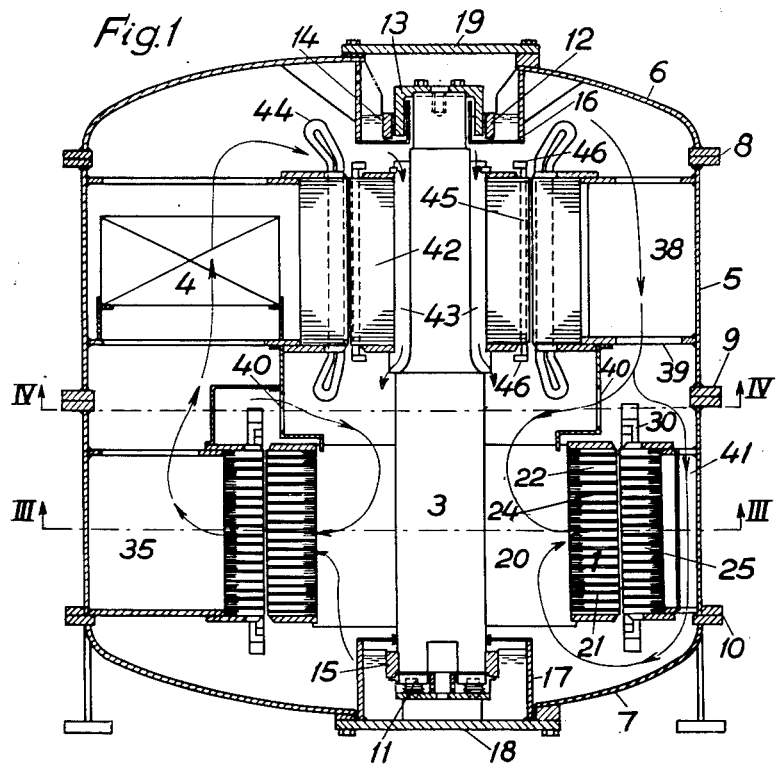

The invention is most readily understood from the accompanying drawing which shows a hydrogen cooled high frequency generator driven by an induction motor. Fig. 1 is a vertical section through the machine and Fig. 2 a section perpendicular to the shaft along the lines III—III and IV—IV in Fig. 1. Fig. 3 is a section through a part of the rotor and stator along a plane through the axis of the machine whereas Figs. 4 and 5 are sections perpendicular to the section in Fig. 3 along the lines I—I and II—II respectively in Fig. 3.

In Fig. 1, I designates the generator and 42 the motor and 3 the vertical common shaft. 4 is the cooler and 5 the housing enclosing the machines which housing is closed by covers 6 and 7. The different parts of the housing are joined by flanges 8, 9 and 10. The common shaft 3 is supported by an end bearing 11 of the Mitchell type and guided at its upper end by a radial bearing 12 consisting of a sleeve 13 attached to the end of the shaft 3 and sliding in a bushing 14. The lower end of the shaft 3 is guided by the bushing 15. The upper and lower bearings are lubricated by oil in the receptacles 16 and 17 respectively. The receptacle 17 is attached to a disk 18 whereas the bearing 12 is accessible by removing the cover 19.

On the centre 20 of the generator-rotor 21 a rim of laminations 22 is attached. This rim is assembled from packages of sheet iron rings which are held apart by spacers 23, so that radial ducts 24 are formed in the rotor.

The stator core 25 of the generator also consists of packages of laminations, some of which according to Fig. 5 are provided with slots 27 commencing at the external periphery and extending inwardly terminating a distance from the air gap thus forming ducts 26 (Fig. 3) whereas some of the packages 28 according to Fig. 4 are provided with slots 29 commencing at the air gap and extending outwardly a distance past the bottom of the slots 27. Between the slots 29 the ordinary slots 30 for the stator winding are located. The field in the air gap is given a suitable distribution by means of the notches 31 located in the periphery of the stator bore, and the poles in the rotor are formed by semi-circular notches 32 located on the periphery of the rotor rim. The winding conductors are designated by 33.

Due to this design the gas escaping from the ducts 24 will flow as shown by the arrows in Fig. 3 through the slots 29 to the ducts 26.

Figure 2:
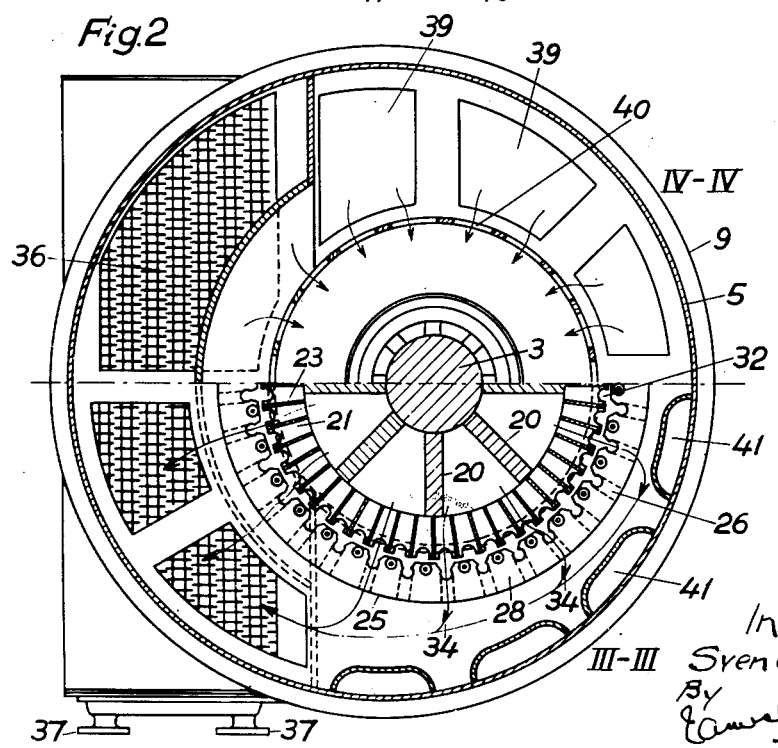

The gas thrown out from the rotor passes the stator core radially in all directions and flows then tangentially along the arrows 34 (Fig. 2) to the space 35 (Fig. 1) in one side of the generator and then upwardly to the cooler 4, which according to Fig. 2 consists of pipes 36 provided with fins (Fig. 2) which by means of the flanges 37 can be connected to a source for some cooling medium for instance water. After having traversed the cooler 4 a part of the gas traverses the motor 42 through its air gap and through channels 43 in its rotor and a part traverses the space 38 and through the ports 39 (Figs. 1 and 2). A part of the latter gas-flow passes through the ports 40 to the centre of the generator rotor and a part of it flows through the ducts 41 to the lower end of the generator and from there into the centre of its rotor.

The motor 42 is a common induction motor having a stator winding 44 and rotor bars 45 with short circuiting rings 46, shown in Fig. 1.

In the machine above described, the rotor was provided with radial ducts for the ventilation, but if the axial slots in the rotor are sufficiently deep such ducts may not be necessary, because the cooling gas then can enter the machine from the ends. The radial slots in the rotor may also be combined with axial ducts for the entrance of the cooling gas, and cooling gas may also enter the stator from its ends through the slots 29.

Instead of mounting a driving motor inside the housing the shaft of the generator may project through the housing provided that there is a gastight seal at that point. In this case the cooler may be arranged on the side of the generator provided that baffles are arranged to collect the gas escaping from the stator and force it through the cooler and back to the rotor gas entrance.

I claim as my invention:

1. A ventilation system for electric machines comprising radially extending ventilation ducts in the stator core of the machine, said ducts extending inwardly from the outer periphery of the core and terminating a distance from the air gap of the machine, ventilation slots in said core extending axially between said ducts and commencing at the air gap and extending radially outwards a distance past the bottom of said ventilation ducts, said ducts and slots being in communication with each other at their bottoms, and radially extending slots located at the inner periphery of the stator core and interposed between said ventilation slots and accommodating the normal stator winding.

2. A ventilation system for electric machines comprising radially extending ventilation ducts in the stator core of the machine, said ducts extending inwardly from the outer periphery of the core and terminating a distance from the air gap of the machine, ventilation slots in said core extending axially between said ducts and commencing at the air gap and extending radially outwards a distance past the bottom of said ventilation ducts, said ducts and slots being in communication with each other at their bottoms, radially extending slots located at the inner periphery of the stator core and interposed between said ventilation slots and accommodating the normal stator winding, and radially extending ducts in the core of the rotor of the machine.

3. A ventilation system for electric machines comprising radially extending ventilation ducts in the stator core of the machine, said ducts extending inwardly from the outer periphery of the core and terminating a distance from the air gap of the machine, ventilation slots in said core extending axially between said ducts commencing at the air gap and extending radially outwards a distance past the bottom of said ventilation ducts, said ducts and slots being in communication with each other at their bottoms, radially extending slots located at the inner periphery of the stator core and interposed between said ventilation slots and accommodating the normal stator winding, and axially extending ventilation slots in the periphery of the rotor of the machine.

SVEN GYNT.

REFERENCES CITED

The following references are of record in the file of this patent:

UNITED STATES PATENTS

| Number | Name | Date |
|---|---|---|
| 890,577 | Richards | June 9, 1908 |

FOREIGN PATENTS

| Number | Country | Date |
|---|---|---|
| 192,525 | Germany | Nov. 18, 1907 |